(12) United States Patent
Martin

(10) Patent No.: US 8,056,154 B2
(45) Date of Patent: Nov. 15, 2011

(54) AUTOMATIC FLUSHING DEVICE WITH MAGNETIC VALVE

(75) Inventor: Christian Martin, Formerie (FR)

(73) Assignee: CELEC Conception Electronique, Neufchatel-en-Bray (FR)

( * ) Notice: Subject to any disclaimer, the term of this patent is extended or adjusted under 35 U.S.C. 154(b) by 834 days.

(21) Appl. No.: 11/596,082

(22) PCT Filed: Mar. 31, 2005

(86) PCT No.: PCT/EP2005/051453
§ 371 (c)(1),
(2), (4) Date: Nov. 9, 2006

(87) PCT Pub. No.: WO2006/000475
PCT Pub. Date: Jan. 5, 2006

(65) Prior Publication Data
US 2007/0204393 A1    Sep. 6, 2007

(30) Foreign Application Priority Data

Jun. 24, 2004   (FR) ...................................... 04 06891

(51) Int. Cl.
*E03D 3/12* (2006.01)
(52) U.S. Cl. ......... 4/325; 4/390; 4/490; 4/313; 137/410; 137/433; 137/426; 137/630.14
(58) Field of Classification Search .............. 4/390, 391, 4/378, 325, 409, 313; 137/410, 433, 426, 137/630.14
See application file for complete search history.

(56) References Cited

U.S. PATENT DOCUMENTS

| | | | | |
|---|---|---|---|---|
| 5,586,455 A | * | 12/1996 | Imai et al. | 68/12.02 |
| 5,594,959 A | * | 1/1997 | Nichols-Roy et al. | 4/415 |
| 2002/0112282 A1 | * | 8/2002 | Han et al. | 4/325 |
| 2008/0229489 A1 | * | 9/2008 | Martin | 4/435 |

FOREIGN PATENT DOCUMENTS

| | | | |
|---|---|---|---|
| DE | 201 14 681 | | 11/2001 |
| GB | 2 167 531 | | 5/1986 |
| GB | 2167531 A | * | 5/1986 |
| JP | 09 316962 | | 12/1997 |
| WO | WO 00/49237 | | 8/2000 |
| WO | WO 0049237 A1 | * | 8/2000 |

* cited by examiner

*Primary Examiner* — Huyen Le
*Assistant Examiner* — Lauren Heitzer
(74) *Attorney, Agent, or Firm* — Young & Thompson

(57) ABSTRACT

A device for opening a toilet flushing system, of the type that includes a water cistern fed by a filling tap, and that includes a bottom discharge orifice and a vertical mobile discharge valve element associated with this orifice, which is capable of occupying a low closed position for keeping the water in the cistern or a high open position to discharge the water to a toilet pan, and of the type that includes a float which, when the cistern is full, is submerged to push the valve element towards its open position, and of the type that includes an element for locking the valve element to keep the valve element closed, characterized in that the float is secured to the valve element and in that the locking element includes a vertically mobile locking finger which is capable of being locked or released by an associated latching element.

20 Claims, 3 Drawing Sheets

AUTOMATIC FLUSHING DEVICE WITH MAGNETIC VALVE

BACKGROUND OF THE INVENTION

1. Field of the Invention

Figure 1:
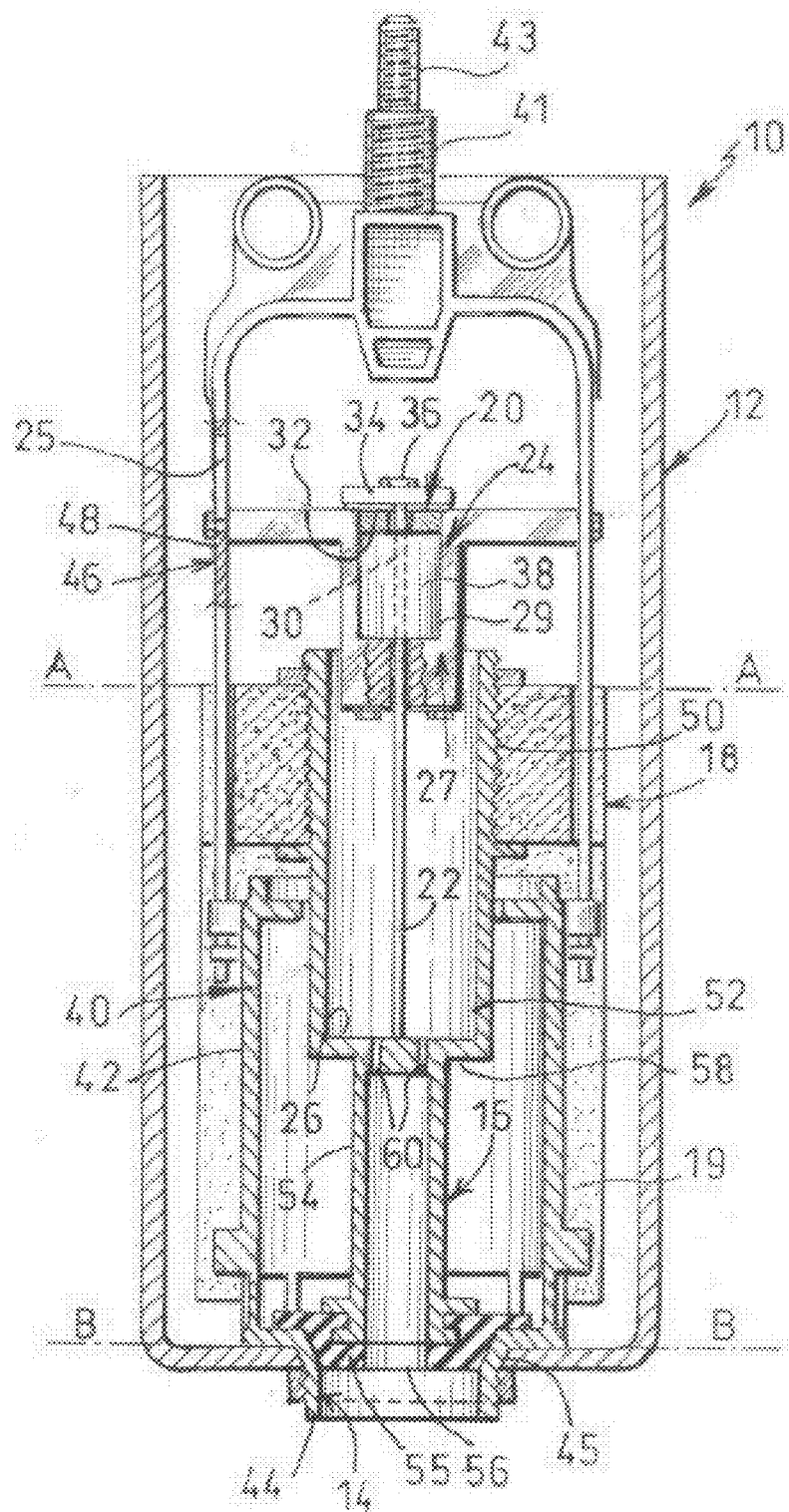

The invention relates to a device for opening a toilet flushing system.

2. Description of the Related Art

The invention relates more particularly to a toilet flushing device, of the type that comprises a water cistern fed via a tap connected to a water delivery network, and which is capable of being opened to cause the cistern to be filled when the water level descends below a determined lower limit, and of the type that comprises a bottom discharge orifice and a vertical mobile discharge valve element associated with this orifice which is capable of occupying a low closed position to keep the water inside the cistern or a high open position to discharge the water to a toilet pan, and of the type that comprises a float which, when the cistern is full, is submerged so as to push the valve element towards its open position, and of the type that comprises a means of locking the valve element that is capable of occupying a locked position to keep the valve element closed or of occupying an unlocked position to allow the float to pull the valve element from its closed position to its open position.

Several toilet flushing devices are known in which a device, which uses Archimedes' principle of buoyancy, makes it possible to transmit a pressure of a submerged float to a valve element for opening the cistern by means of a transmission mechanism such as a lever.

In such devices, the float is usually immobilized by means of a latching mechanism and when it is released it is capable of transmitting its upward movement to the valve element by means of the transmission mechanism to cause the said valve element to open.

Control of the latching mechanism may easily be provided by a solenoid or electromagnet operating at low voltage and in autonomous manner.

This configuration makes it possible in particular to propose automatically controlled flushing systems which, when the user leaves the toilet, automatically trigger the actuation of the element for opening the cistern in order to cause the water to be discharged to the toilet pan, the electromagnet then being controlled electronically.

This configuration, however effective it may be, nonetheless has some disadvantages.

To be able effectively to raise the valve element, the float must necessarily be arranged at the end of the lever. As a result, due to the bending deformations of the said lever, its position is not strictly defined in the cistern, so that it is necessary to provide a latching mechanism of large dimensions capable of interacting with the float even if the latter moves by a few millimeters.

Secondly, the transmission mechanism in itself is costly to produce.

Furthermore, the latching mechanism is also costly to produce, since it requires in effect at least one system comprising a cam interposed between the electromagnet and the float.

Finally, the float and transmission mechanism assembly occupies a considerable volume in the cistern, which makes the flushing system maintenance operations difficult, whether they be repair, cleaning or descaling operations.

To remedy this disadvantage, document WO-A-00/49237 has proposed a device arranged substantially coaxially with the discharge valve element, in order to reduce the number of elements used.

More particularly, document WO-A-00/49237 proposes a toilet flushing system opening device of the type previously described, in which the float is secured to the valve element and in which the locking means comprises a vertically mobile locking finger, substantially coaxial with the valve element and secured to the latter, the end of which is capable of being held laterally in a locked position or released in an unlocked position by the end of a tilting lever which is articulated relative to the cistern and which is capable of being actuated by a solenoid in order selectively to prevent or allow the finger and the valve element to rise under the action of the float in order to discharge the water into the toilet pan.

This design has numerous disadvantages.

On the one hand, the finger is secured to the valve element, which makes the mounting or removal of the assembly consisting of the finger and the valve element particularly tricky due to its bulk.

On the other hand, the complex design of the tilting lever is incompatible with an environment subject to high humidity. Specifically, limescale concretions, caused by the water contained in the cistern, may form on the articulation of the lever, or between the lever and the finger, and disrupt the smooth operation of the device.

SUMMARY OF THE INVENTION

To remedy these disadvantages, the invention proposes a device of the type previously described, characterized in that the float is secured to the valve element and in that the locking means comprises a vertically mobile locking finger, substantially coaxial with the valve element and independent of the said valve element which can be moved between:
- a locked position, in which a means of latching the locking means coaxial with the finger is activated to immobilize the finger axially so that it is locked in contact with a top bearing face of the valve element in order to immobilize the valve element,
- an unlocked position, in which the means of latching the locking means is deactivated to release the finger and to allow the finger and the valve element to rise under the action of the float in order to discharge the water to the toilet pan.

According to other features of the invention:
- the latching means is activated by default and is capable of being deactivated electrically;
- the latching means comprises:
  a permanent magnet which is arranged close to a vertical section of the finger and an upper portion of which keeps a metal plate attached to the free end of the vertical section of the finger under the influence of its permanent magnetic field,
  a solenoid, arranged close to the permanent magnet, which is capable of being controlled electrically to set a temporary field against the magnetic field created by the permanent magnet to release the metal plate attached at the free end of the vertical section of the finger;
- the device comprises a support having a substantially "U" shape whose horizontal branch is traversed by the vertical section of the finger, and whose vertical branches receive the permanent magnet and the solenoid, substantially cylindrical in shape, which are traversed by the vertical section of the finger;
- the valve element is substantially tubular and the locking finger and the latching means are coaxial with the valve element;

the cistern comprises a cage which comprises:
a tubular bottom portion of which a bottom end threaded bearing surface traverses a hole of the cistern to provide for the attachment of the said bottom portion, which comprises internally the discharge orifice, and in which the valve element is mounted slidingly,
a top portion of inverted "U" shape, whose top arms are attached to the tubular bottom portion, and between the said top arms of which the locking means is attached,
a top end of a top portion of the tubular valve element, protruding outside the tubular bottom portion of the cage between the arms of the top portion of the cage, to allow the tubular valve element to be attached to the float;
the float has substantially the shape of an inverted "U", whose horizontal branch traverses the top arms of the top portion of the cage, whose lateral arms surround the bottom portion of the cage and the float is fitted over the top end of the valve element;
the float is made of expanded polystyrene and the top end of the cylindrical valve element comprises, on its outer periphery, teeth intended to help the coupling of the float onto the valve element;
the valve element comprises:
the top tubular portion, inside which the vertical section of the finger is received,
a bottom tubular portion, a frustoconical bottom end of which forms a seat of the valve element associated with the discharge orifice,
and a transverse internal wall, delimiting the top tubular portion and the bottom tubular portion, pierced by at least one orifice forming an overflow,
and the frustoconical bottom end comprises at least one end hole of a smaller diameter than the discharge orifice to allow the discharge of the water originating from the orifice forming an overflow;
the transverse internal wall comprises the top bearing face of the valve element.

The invention also relates to a method of controlling a device of the type described above. According to this method, to actuate the flushing device, a brief electric pulse is sent to the solenoid of the latching means.

BRIEF DESCRIPTION OF THE DRAWING FIGURES

Figure 2:
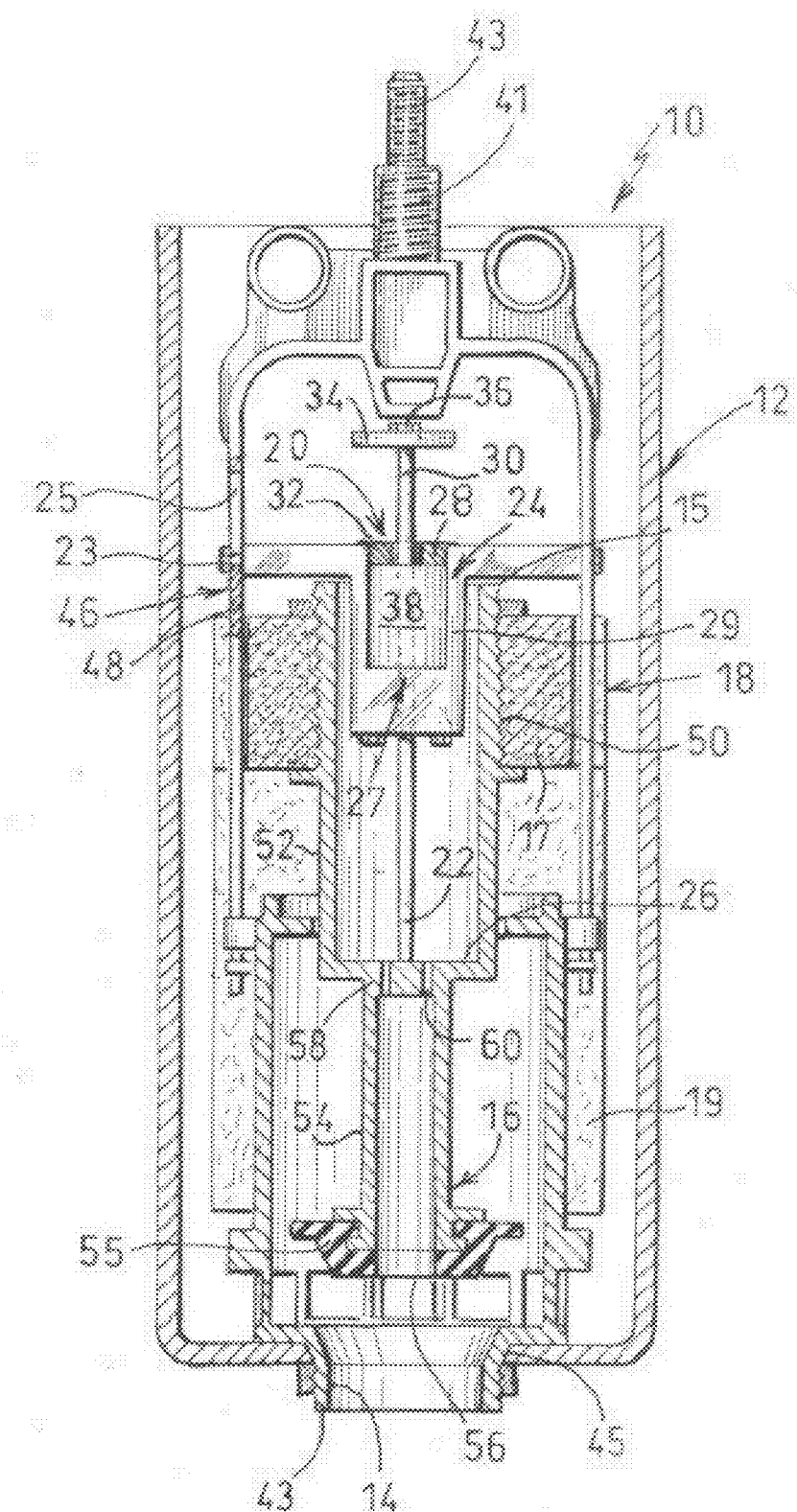
Figure 3:
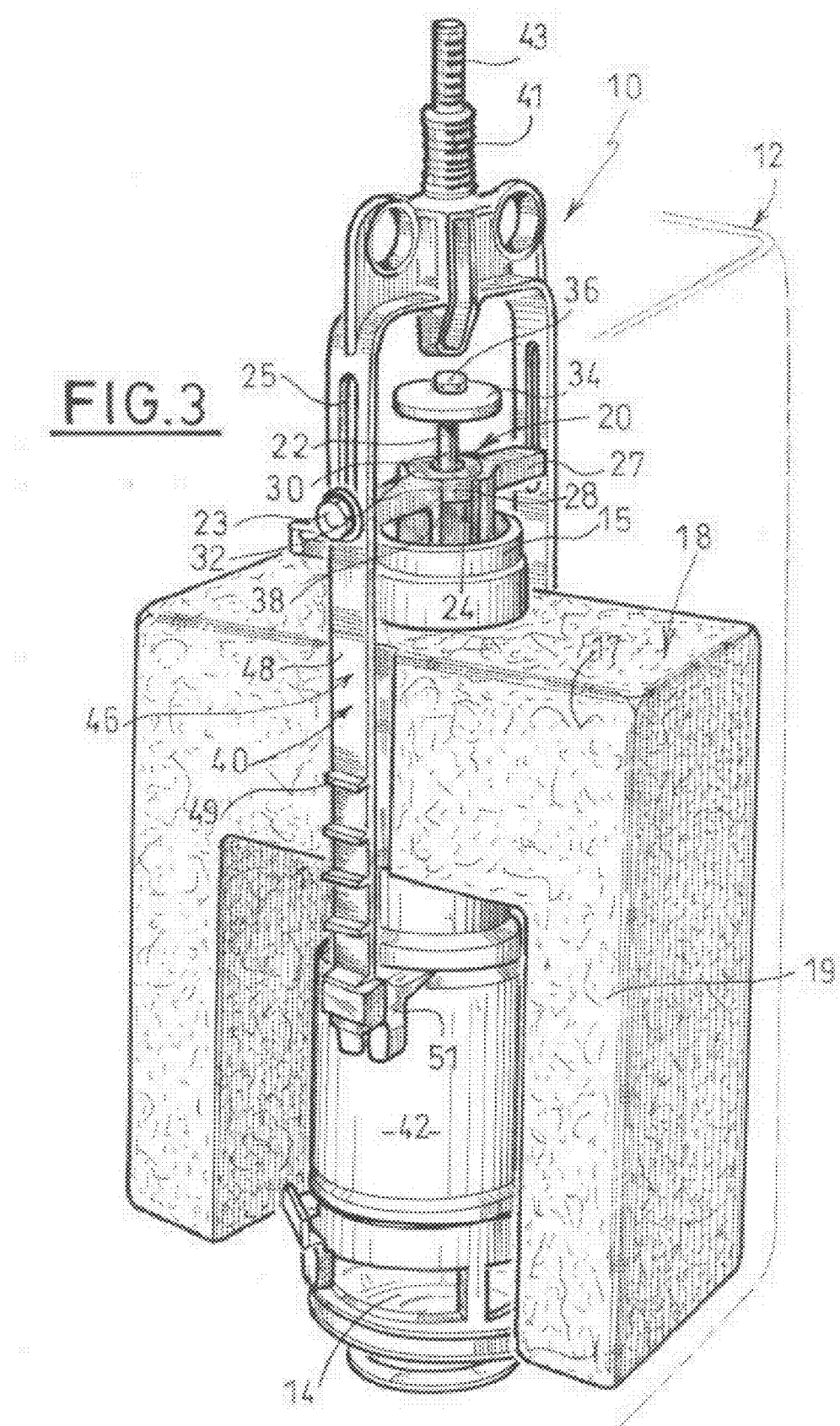

Other features and advantages of the invention will appear on reading the following detailed description for the comprehension of which reference should be made to the appended drawings in which:

FIG. 1 is a schematic view in section representing a device according to the invention with the valve element closed, FIG. 2 is a schematic view in section representing a device according to the invention with the valve element open, FIG. 3 is a view in perspective of the device according to the invention.

DETAILED DESCRIPTION OF THE INVENTION

In the following description, elements that are identical or have similar functions bear the same reference numbers.

FIGS. 1 to 3 show the whole of a device 10 for opening a toilet flushing system.

In a known manner, as illustrated more particularly by FIGS. 1 and 2, the device 10 comprises a water cistern 12 which is fed by a tap (not shown) which is connected to a water delivery network.

In a known manner, as illustrated by FIG. 1, this tap is capable of being opened to cause the cistern 12 to fill when the water level descends below a determined lower limit "B". The tap is intended to close automatically when the water level reaches an upper limit "A".

The cistern 12 comprises a bottom discharge orifice 14 and a vertical mobile discharge valve element 16 which is associated with this orifice 14.

The valve element 16 is capable of occupying a low closed position, which has been represented in FIG. 1, to keep the water inside the cistern 12 or a high open position, which has been represented in FIG. 2, to discharge the water to a toilet pan (not shown).

In a known manner, the device 10 comprises a float 18 which, when the cistern 12 is full, is submerged so as to push the valve element 16 towards its open position in FIG. 2 according to the well known principle called "Archimedes' principle of buoyancy".

The device 10 also comprises a means 20 of locking the valve element 16 that is capable of occupying a locked position, shown in FIG. 1, to keep the valve element 16 closed, or of occupying an unlocked position, shown in FIG. 2, to allow the float 18 to pull the valve element 16 from its closed position to its open position.

According to the invention, the float 18 is secured to the valve element 16 and the locking means 20 comprises a vertically mobile locking finger 22, substantially coaxial with the valve element 16 and independent of, i.e., not fixedly connected to the valve element 16 which can be moved between:
a locked position, in which a means 24 of latching the locking means 20 coaxial with the finger 22 is activated to immobilize the finger 22 axially so that it is locked in contact with a top bearing face 26 of the valve element 16 in order to immobilize the valve element 16,
an unlocked position, in which the means 24 of latching the locking means 20 is deactivated to release the finger 22 and to allow the finger 22 and the valve element 16 to rise under the action of the float 18 in order to discharge the water to the toilet pan.

The finger 22 being advantageously independent of the top bearing face 26 of the valve element, mounting and removal of the device 10 are extremely easy.

In the preferred embodiment of the invention, the latching means 24 is activated by default and it is capable of being deactivated electrically. As a result, once the cistern 12 has been filled with water by means of the tap, the water remains in the cistern 12 until the latching means 24 is deactivated electrically.

Any known means of the prior art may be suitable for producing the coaxial latching means 24 under the meaning of the invention.

However, in the preferred embodiment of the invention, the latching means 24 consists of a "magnetic valve" which comprises a permanent magnet 28 which is arranged close to a vertical section 30 of the finger 22 and a upper portion 32 of which keeps a metal plate 34 attached to the free end 36 of the vertical section 30 of the finger 22 under the influence of its permanent magnetic field, as shown in FIG. 1.

For example, the finger 22 may consist of a rod which forms the vertical section 30 and whose threaded end traverses the metal plate 34, the metal plate 34 being attached to the rod by a nut.

The latching means also comprises a solenoid 38, more commonly known as an "electromagnet", which is arranged close to the permanent magnet 28 and which is capable of being controlled electrically, as shown in FIG. 2, to set a temporary field against the magnetic field created by the permanent magnet 28.

In the preferred embodiment of the invention, and in a manner non-limiting of the latter, as shown in FIGS. 1 to 3, the permanent magnet 28 is traversed by a vertical section 30 of the finger 22. It will be understood that the vertical section 30 of the finger 22 may occupy any configuration close to the permanent magnet without being limited in any way by the configuration that has been described here as an example only.

In this way, when the solenoid 38 is electrically powered, the temporary field of the solenoid 38 opposes the permanent field of the permanent magnet 28. This is used to release the metal plate 34 secured to the free end 36 of the vertical section 30 of the finger 22.

This design has the advantage of directly immobilizing or releasing the end of the finger 22 without using additional locking elements which could be blocked by limescale concretions which could form in the cistern.

As has been shown in FIGS. 1 and 2, the device comprises a support 27 having a substantially "U" shape whose horizontal branch is traversed by the vertical section 30 of the finger 22, and whose vertical branches receive the permanent magnet 28 coupled to the solenoid 38, both of them substantially cylindrical in shape, which are received between the branches 29 of the "U" of the support 27 and are traversed by the vertical section 30 of the finger 22.

Furthermore, the valve element 16 is substantially cylindrical. The locking finger 22 and the latching means 24, that is to say the solenoid 38, the permanent magnet 28 and the finger 22, are substantially coaxial with the valve element 16. This configuration is in no way limiting of the invention, but it is used to minimize the bulk of the device 10.

To retain the valve element 16 and the latching means 24, the cistern 12 comprises a cage 40 which comprises a tubular bottom portion 42, of which a bottom end threaded bearing surface 43 traverses a hole 45 of the cistern 12 to provide for the attachment of the said bottom portion 42. The bottom portion 42 of the cage 40 comprises the discharge orifice 14 and the valve element 16 is mounted slidingly inside the bottom portion 42 in order to selectively block off or uncover the discharge orifice 14.

The cage 40 also comprises a top portion 46 of inverted "U" shape whose top arms 48 are attached to the bottom portion 42. The top arms 48 comprise, at their bottom ends, notches 49 used for adjusting their height in eyelets 51 of the bottom portion 42.

The locking means 20 is attached between the said top arms 48. As a result, the permanent magnet 28 comprises, at its transverse ends, screws 23 for adjustably attaching the top arms 48 in the openings 25.

Note that the top portion 46 may advantageously comprise a thread 41 for the attachment of electronic accessories (not shown) and a coaxial thread 43 for the attachment of a cover (not shown) of the cistern.

In this configuration, a top end 15 of the valve element 16 protrudes outside the tubular bottom portion 42 of the cage 40 and between the arms 48 of the top portion 46, to allow the valve element 16 to be attached to the float 18.

Furthermore, the float 18 has substantially the shape of an inverted "U" whose horizontal branch 17 traverses the top arms 48 of the top portion 46 of the cage 40 and whose lateral arms 19 surround the bottom portion 42 of the cage 40. The float 18 is fitted at its horizontal branch 17 over the protruding end 15 of the valve element 16.

More particularly, the float 18 is made of expanded polystyrene. For the attachment of the float 18 and of the valve element 16, the protruding top end 15 of the valve element 16 comprises teeth 50 intended to help the coupling of the float 18 to the valve element 16.

Advantageously, the valve element 16 comprises a top tubular portion 52, which comprises the top end 15, inside which the vertical section 30 of the finger 22 is received, and a bottom tubular portion 54, of which a frustoconical bottom end 55, made for example of elastomer, forms a seat of the valve element 16 associated with the discharge orifice 14.

The valve element 16 also comprises a transverse internal wall 58, delimiting the top tubular portion 52 and the bottom tubular portion 54 which is pierced by at least one orifice 60 forming an overflow. This orifice 60 is intended to allow the passage of water in the valve element 16 towards a hole 56 in the frustoconical bottom end 55. This hole 56 is of a smaller diameter than the discharge orifice 14 to allow the discharge of the water.

Advantageously, the transverse internal wall 58 comprises the top bearing face 26 of the valve element 16 which is intended to receive the bearing finger 22 and the orifice 60 is disposed radially relative to the bearing point of the finger 22.

Accordingly, the finger 22 is of a suitable length.

The bearing face 26 may comprise several orifices 60, distributed angularly in regular manner around the finger 22.

If the tap becomes jammed in the open position, the water overflows via the top end 15 of the valve element 16 into the said valve element and is discharged via the orifice 60 and the hole 56 in the toilet pan and prevents the cistern 12 from overflowing.

In this configuration, it will be understood that a method of controlling such a device 10 comprises, to actuate the flushing system, at least one step during which a brief electric pulse is sent to the solenoid 38 of the latching means 24, which has the effect of temporarily releasing the finger 22 and allowing the valve element 16 to rise under the effect of the Archimedes buoyancy applied to the float 18 as shown in FIG. 2.

An electronic control system (not shown), which is attached to the thread 41, is for example possibly used to cause the release of the finger 22 by sending an electric pulse to the solenoid 38. Batteries may, for example, be used to power a cascade of modules, comprising an electronic detection module which transmits an item of information, relative to the presence or absence of a user, to an amplification module, which transmits this item of information to a central unit which determines the time the user has been present and, when the presence of the user is no longer detected after a certain time, triggers the transmission of a pulse to a module for controlling the solenoid 38, which supplies an electric pulse to the said solenoid 38 so that the latter releases the finger 22 and causes the flushing system to be flushed.

As can be seen, this device 10 for opening a flushing system is particularly advantageous because it makes it possible to use only elements powered at a low voltage supplied by batteries, the Archimedes buoyancy forming the main source of energy for all the forces that consume much energy.

The invention claimed is:

1. A device (10) for opening a toilet flushing system, that comprises a water cistern (12) fed via a tap intended to be connected to a water delivery network, and which is capable of being opened to cause the cistern (12) to be filled when a water level descends below a determined lower limit (B), said device (10) comprising:
 a bottom discharge orifice (14);
 a vertical mobile discharge valve element (16) associated with the orifice (14) which is capable of occupying a low closed position to keep the water inside the cistern (12) or a high open position to discharge the water to a toilet pan, and comprises a float (18) which, when the cistern (12) is full, is submerged so as to push the valve element (16) towards an open position; and means (20) for locking the valve element that is capable of occupying a locked position to keep the valve element (16) closed or of occupying an unlocked position to allow the float (18) to pull the valve element (16) from the closed position to the open position, wherein the float (18) is secured to the valve element (16) and the means (20) for locking comprises a vertically mobile locking finger (22), substantially coaxial with the valve element (16) and not fixedly connected to said valve element (16) which can be moved between:

the locked position, in which a latch (24) configured for latching the means (20) for locking coaxial with the finger (22) is activated to immobilize the finger (22) axially so that the finger is locked in contact with a top bearing face (26) of the valve element (16) in order to immobilize the valve element (16), the unlocked position, in which the latch (24) is deactivated to release the finger (22) and to allow the finger (22) and the valve element (16) to rise under the action of the float (18) in order to discharge the water to the toilet pan.

2. The device (10) according to claim 1, wherein the latch (24) is activated by default and in that it is capable of being deactivated electrically.

3. The device (10) according to claim 2, wherein the latch (24) comprises:

a permanent magnet (28) which is arranged close to a vertical section (30) of the finger (22) and an upper portion (32) of which keeps a metal plate (34) attached to a free end (36) of the vertical section (30) of the finger (22) under an influence of the magnet's permanent magnetic field; and a solenoid (38), arranged close to the permanent magnet (28), which is capable of being controlled electrically to set a temporary field against the magnetic field created by the permanent magnet (28) to release the metal plate (34) attached at the free end (36) of the vertical section (30) of the finger (22).

4. The device according to claim 3, wherein the device further comprises a support (27) having a substantially "U" shape whose horizontal branch is traversed by the vertical section (30) of the finger (22), and whose vertical branches receive the permanent magnet (28) and the solenoid, substantially cylindrical in shape, which are traversed by the vertical section (30) of the finger (22).

5. The device (10) according to claim 1, wherein the valve element (16) is substantially tubular and in that the locking finger (22) and the latch (24) are coaxial with the valve element (16).

6. The device (10) according to claim 5, wherein the cistern (12) comprises a cage (40) which comprises:

a tubular bottom portion (42) of which a bottom end threaded bearing surface traverses a hole of the cistern to provide for the attachment of the said bottom portion, which comprises internally the discharge orifice, and in which the valve element (16) is mounted slidingly;

a top portion (46) of inverted "U" shape, whose top arms (48) are attached to the tubular bottom portion, and between the said top arms (48) of which the locking means (20) is attached; and a top end (15) of a top portion (52) of the tubular valve element, protruding outside the tubular bottom portion of the cage between the arms of the top portion of the cage, to allow the tubular valve element to be attached to the float.

7. The device (10) according to claim 6, wherein the float (18) has substantially a shape of an inverted "U", whose horizontal branch traverses the top arms of the top portion of the cage (40), whose lateral arms surround the bottom portion of the cage (40) and in that the float is fitted over the top end of the valve element.

8. The device according to claim 7, wherein the float is made of expanded polystyrene and in that the top end of the cylindrical valve element comprises, on the valve element's outer periphery, teeth configured to help the coupling of the float to the valve element.

9. The device (10) according to claim 6, wherein the valve element (16) comprises:

the top tubular portion (52), inside which the vertical section (30) of the finger (22) is received;

a bottom tubular portion (54), a frustoconical bottom end of which forms a seat of the valve element (16) associated with the discharge orifice (14); and a transverse internal wall, delimiting the top tubular portion and the bottom tubular portion, pierced by at least one orifice (60) forming an overflow, wherein the frustoconical bottom end comprises at least one end hole (56) of a smaller diameter than the discharge orifice (14) to allow the discharge of the water originating from the orifice (60) forming an overflow.

10. The device (10) according to claim 9, wherein the transverse internal wall (58) comprises the top bearing face (26) of the valve element.

11. A method of controlling a device according to claim 3, comprising
actuating the flushing device by sending a brief electric pulse to the solenoid (38) of the latch (24).

12. The device (10) according to claim 2, wherein the valve element (16) is substantially tubular and in that the locking finger (22) and the latch (24) are coaxial with the valve element (16).

13. The device (10) according to claim 3, wherein the valve element (16) is substantially tubular and in that the locking finger (22) and the latch (24) are coaxial with the valve element (16).

14. The device (10) according to claim 4, wherein the valve element (16) is substantially tubular and in that the locking finger (22) and the latch (24) are coaxial with the valve element (16).

15. A method of controlling a device according to claim 4, comprising:
actuating the flushing device by sending a brief electric pulse to the solenoid (38) of the latch (24).

16. A method of controlling a device according to claim 5, comprising:
actuating the flushing device by sending a brief electric pulse to the solenoid (38) of the latch (24).

17. A method of controlling a device according to claim 6, comprising:
actuating the flushing device by sending a brief electric pulse to the solenoid (38) of the latch (24).

18. A method of controlling a device according to claim 7, comprising:
actuating the flushing device by sending a brief electric pulse to the solenoid (38) of the latch (24).

19. A method of controlling a device according to claim 8, comprising:
actuating the flushing device by sending a brief electric pulse to the solenoid (38) of the latch (24).

20. A method of controlling a device according to claim 9, comprising:
actuating the flushing device by sending a brief electric pulse to the solenoid (38) of the latch (24).

* * * * *